UNITED STATES PATENT OFFICE.

HENRY STALAY ARTHUR HOLT AND GERHARD STEIMMIG, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

PRODUCING SUBSTANCES RESEMBLING CAOUTCHOUC.

1,189,110. Specification of Letters Patent. Patented June 27, 1916.

No Drawing. Original application filed August 22, 1912, Serial No. 716,442. Divided and this application filed September 26, 1913. Serial No. 791,938.

*To all whom it may concern:*

Be it known that we, HENRY STALAY ARTHUR HOLT and GERHARD STEIMMIG, subjects, respectively, of the King of England and of the King of Prussia, residing at Ludwigshafen-on-the-Rhine, Germany, have invented new and useful Improvements in Producing Substances Resembling Caoutchouc, of which the following is a specification, being divided out of the application for patent, Serial No. 716,442, filed August 22, 1912.

In the specification of our application for patent Serial No. 716,442, from which the present application is a division, it is stated that the polymerization of 1.3-butadiene and of other hydrocarbons of the same homologous series, such for instance as isoprene, 1-methyl-1.3-butadiene and 2.3-dimethyl-1.3-butadiene, can be considerably accelerated and the yield of caoutchouc considerably increased if the butadiene, or other hydrocarbon, be polymerized in the presence of from about 2% to 5% of a substance which is capable of supplying oxygen to the said hydrocarbon. It is further stated that the substance may be capable either of itself giving up oxygen or of acting as a carrier of oxygen, and as instances of such substances are mentioned oxidized caoutchouc (either natural or synthetic, and either vulcanized or not) which can be prepared, for instance, by treating caoutchouc with oxygen or ozone, also butadiene or a member of the same homologous series which has been treated with ozone or other suitable oxidizing agent, terpenes, and further benzoyl superoxid, perborates, hydrogen peroxid, cerium sulfate, and blue vanadium salt. The claims of the said application for patent Serial No. 716,442 are directed generically to the polymerization of a butadiene hydrocarbon in the presence of from about 2% to 5% of a substance capable of supplying oxygen to the said hydrocarbon, and specifically to the employment of a terpene ozonid as addition during the polymerization.

In the present application we desire to claim specifically the employment during the polymerization of an oxidized hydrocarbon of the butadiene series in which the carbon nucleus of the hydrocarbon exists intact.

The following examples will serve to illustrate further the nature of our invention, but the invention is not limited to these examples.

Example 1: Pass ozone into isoprene and then add a small quantity, say, about 3%, of this ozonized isoprene to fresh isoprene. By treatment with the ozonized isoprene, the fresh isoprene is polymerized.

Example 2: Mix 100 parts by weight of 2.3-dimethyl-1.3-butadiene with 3 parts by weight of 2.3-dimethyl-1.3-butadiene ozonid (obtainable from 2.3-dimethyl-1.3-butadiene and ozone) and polymerize by heating at 100° C. In this example, instead of 2.3-dimethyl-1.3-butadiene ozonid, isoprene ozonid may be employed.

Now what we claim is:—

1. The process of producing substances resembling caoutchouc which consists in polymerizing a hydrocarbon of the butadiene series in the presence of from about two to five per cent. of an oxidized hydrocarbon of the butadiene series in which the carbon nucleus of the hydrocarban exists intact.

2. The process of producing substances resembling caoutchouc which consists in polymerizing isoprene in the presence of from about two to five per cent. of isoprene ozonid.

In testimony whereof we have hereunto set our hands in the presence of two subscribing witnesses.

HENRY STALAY ARTHUR HOLT.
GERHARD STEIMMIG.

Witnesses:
JOSEPH PFEIFFER,
J. ALEC. LLOYD.